United States Patent
Elduayen Madariaga et al.

(10) Patent No.: US 9,897,126 B2
(45) Date of Patent: Feb. 20, 2018

(54) SEALING PLUG FOR CLOSING HOLES IN WALLS AND THE LIKE

(71) Applicants: 20 EMMA 20 S.L., Andoain (ES); HEGAIN 2100 Consulting S.L., Irun (ES)

(72) Inventors: Juan Andrés Elduayen Madariaga, Andoain (ES); Javier Sanchez Garduño, Irun (ES)

(73) Assignees: HEGAIN 2100 CONSULTING S.L., Irun (ES); 20 EMMA 20 S.L., Aduna (ES)

( * ) Notice: Subject to any disclaimer, the term of this patent is extended or adjusted under 35 U.S.C. 154(b) by 0 days.

(21) Appl. No.: 14/899,368

(22) PCT Filed: May 26, 2014

(86) PCT No.: PCT/EP2014/060777
§ 371 (c)(1),
(2) Date: Dec. 17, 2015

(87) PCT Pub. No.: WO2014/202338
PCT Pub. Date: Dec. 24, 2014

(65) Prior Publication Data
US 2016/0177996 A1    Jun. 23, 2016

(30) Foreign Application Priority Data
Jun. 17, 2013 (ES) .................................. 201330904

(51) Int. Cl.
   *B65D 53/00*      (2006.01)
   *F28F 11/04*      (2006.01)
(Continued)

(52) U.S. Cl.
    CPC ...... *F16B 19/1054* (2013.01); *E04G 17/0644* (2013.01); *F16L 55/132* (2013.01); *F16B 2013/006* (2013.01)

(58) Field of Classification Search
    CPC .... B65D 39/12; F16B 19/1054; F16L 55/132; F16L 55/136; F16L 55/128; F28F 11/04
(Continued)

(56) References Cited

U.S. PATENT DOCUMENTS 4,585,382 A     4/1986   Bryce, Jr.
4,771,810 A *   9/1988   Ermold .................... F28F 11/02
                                                          138/89
(Continued)

FOREIGN PATENT DOCUMENTS

EP        1454069 B1    9/2004
ES        1060376 U     9/2005
(Continued)

OTHER PUBLICATIONS

International Searching Report and Written Opinion for PCT International Application No. PCT/EP2014/060777 issued by the European Patent Office, 10 pages, Rijswijk, Netherlands dated Aug. 13, 2014.

*Primary Examiner* — Andrew T Kirsch
(74) *Attorney, Agent, or Firm* — Peter B. Scull; Hamilton DeSanctis & Cha, LLP

(57) ABSTRACT

A sealing plug including an elastic body and a stem coaxially assembled to one another. The elastic body has a main body which is suitable for being expanded radially when pulling on the free end of the stem which emerges out of said elastic body. The elastic body also has a head attached to the main body, the head having a compressive strength less than that in the main body.

13 Claims, 5 Drawing Sheets

(51) Int. Cl.
*B65D 39/12* (2006.01)
*F16L 55/132* (2006.01)
*F16L 55/136* (2006.01)
*F16L 55/128* (2006.01)
*F16B 19/10* (2006.01)
*E04G 17/06* (2006.01)
*F16B 13/00* (2006.01)

(58) Field of Classification Search
USPC ......................................................... 220/234
See application file for complete search history.

(56) References Cited

U.S. PATENT DOCUMENTS

| | | | |
|---|---|---|---|
| 6,138,419 | A | 10/2000 | Sekiguchi et al. |
| 6,315,510 | B1 | 11/2001 | Sturies et al. |
| 8,403,007 | B1 | 3/2013 | Marinelli |

FOREIGN PATENT DOCUMENTS

| | | | |
|---|---|---|---|
| ES | 2525191 | A2 | 12/2014 |
| GB | 2157788 | A | 10/1985 |
| WO | 2003052282 | A1 | 6/2003 |
| WO | 2006128928 | A1 | 12/2006 |
| WO | 2014202338 | A1 | 12/2014 |

\* cited by examiner

SEALING PLUG FOR CLOSING HOLES IN WALLS AND THE LIKE

TECHNICAL FIELD

The present developments relate to plugs for sealing and closing holes in walls and the like.

BACKGROUND

Sealing plugs for closing holes in walls and the like, of the type including an elastic body and a stem such that the elastic body expands radially by pulling on the stem, are known. Such plugs are widely used for sealing holes that are provided for example in a concrete wall due to the manufacturing process. As is well known, concrete walls are manufactured allowing a gap between formwork panels which are arranged facing one another. Said panels are secured to one another by transverse bolts having threaded ends projecting out of the panels to be able to screw the corresponding nuts. Once the panels are secured, the concrete is poured into the gap which is arranged sandwiched between the formwork panels. To prevent the concrete from adhering to the transverse bolts once set, these bolts are usually first covered or placed inside a tube (normally made of plastic) which is sometimes removed when stripping formwork and other times not. Once the concrete has set, the formwork panels are dismantled and the transverse bolts are disassembled. Therefore, once said transverse bolts are disassembled, they create through holes in the concrete wall which must be closed and sealed to prevent water leaks.

SUMMARY

Disclosed is a sealing plug for closing holes in walls and the like as described below.

The sealing plug hereof may include an elastic body and a stem coaxially assembled to one another. The elastic body may include a main body which is configured for being expanded radially when pulling on the free end of the stem which emerges out of said elastic body. Said elastic body also may include a head attached to the main body, said head having a compressive strength less than that in the main body.

A plug hereof may improve the sealing of a hole to be plugged in a wall or the like, for example, in a tank, in a simple, economical and reliable manner. Such a plug may assure good hermetic closure of the hole on the inner face thereof while at the same time may also assure good hermetic closure of the outer wall. Sealing the inner gap of the formwork, i.e., the inner face of the hole, is often insufficient because water leaks can still take place between the protective tube, which is placed to protect the transverse bolts used to attach the formwork panels together, and the concrete, for example. In addition to internally sealing the hole, a sealing plug hereof may also assure sealing from the outside such that said leaks between the protective tube and the concrete can be prevented without needing to use additional sealing means such as O-rings, fillers, cements or the like, which is very advantageous for sealing holes in the walls of a water tank in a reliable, economical and simple manner since special skills for sealing said hole on the outside are not required.

These and other advantages and features of the present subject matter will become evident in view of the drawings and the detailed description that follows.

DETAILED DISCLOSURE

Figure 1:
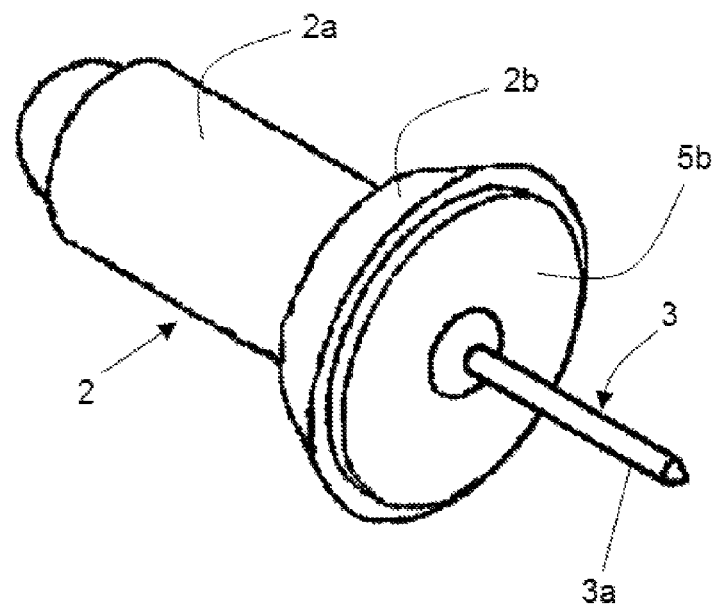
FIG. 1 shows an isometric view of a first implementation of a sealing plug according to the presently-described subject matter.

A sealing plug 1 according to a first implementation hereof is shown including an elastic body 2 and a stem 3 coaxially assembled with one another as shown in FIG. 1 and in the rest of the drawings. The elastic body 2 includes a main body 2a which is configured for being expanded radially when pulling on the free end 3a of the stem 3 which emerges out of said elastic body 2. Said elastic body 2 also includes a head 2b attached to the main body 2a, said head 2b having a compressive strength less than that in the main body 2a.

The stem 3 of the plug 1 of said first implementation is preferably a rivet, like in the rest of the implementations that will be detailed later.

The description and arrangement of the stem 3 of this first implementation is similar to the rest of the implementation that will be detailed throughout the description herein. Therefore, as seen in FIGS. 1, 2A, 2B, 3A, 3B, 3C, and 3D, one end of the stem 3 is arranged inside the elastic body 2 whereas the other end, preferably having a sharp-pointed shape, emerges from one end of the elastic body 2 corresponding with the free end of the head 2b of said elastic body 2.

Figure 2A:
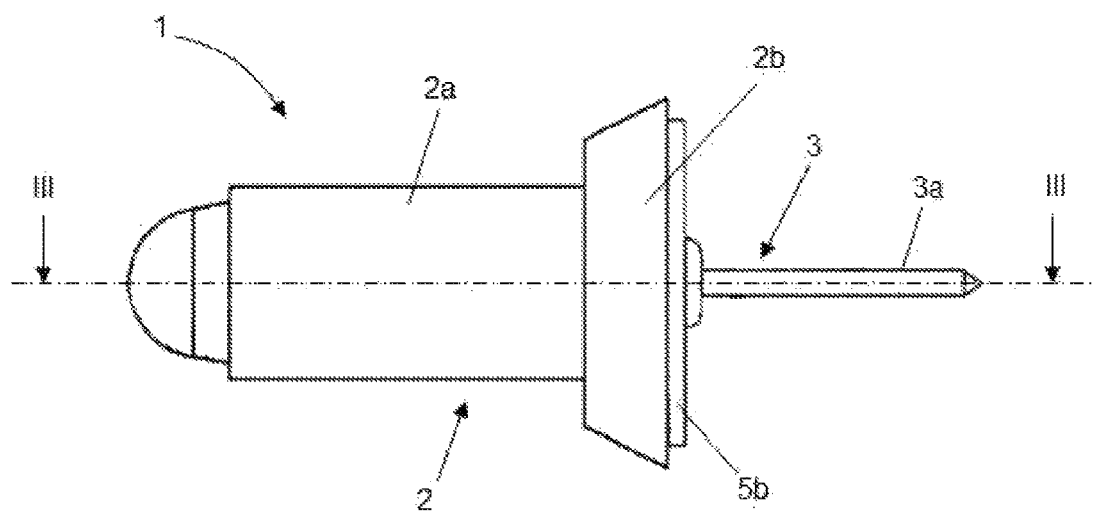
FIG. 2A shows a side view of the sealing plug of FIG. 1.

The main body 2a of the elastic body 2 is substantially cylindrical and, as shown in FIGS. 1 and 2A, is attached at one end to the head 2b which has a greater diameter. The other end of the main body 2a is a closed end and preferably has a bell shape although said shape is not relevant for the present subject matter.

In addition, the stem 3 of the plug of said first implementation, like the rest of the implementations, has a main rod 3', preferably having a cylindrical shape, attached to a head 3" having a greater diameter. The free end 3a emerging from the elastic body 2 corresponds with the free end of said main rod 3'. The head 3" of the stem 3 is arranged inside the elastic body 2, preferably inside the main body 2a and more specifically close to the bell-shaped end.

Figure 3A:
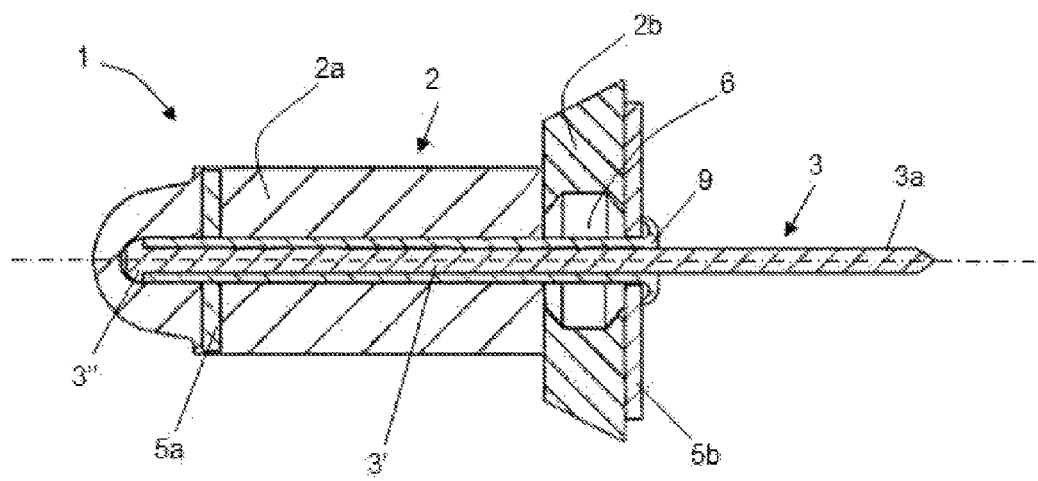
FIG. 3A is a cutaway view of the sealing plug of FIG. 2A.

As seen in the example of FIG. 3A, the plug 1 of the present disclosure according to the first implementation has a first thrust washer 5a and a second thrust washer 5b. The first thrust washer 5a is arranged in the main body 2a close to the opposite end of the area of attachment between said main body 2a and the head 2b. Said first washer 5a is preferably arranged inside said main body 2a, as seen in detail in the example of FIG. 3A. The second thrust washer 5b is arranged adjacent to the free outer face of the head 2b of the elastic body 2 as seen in the drawings.

For sealing the hole 4 in a wall (such as that shown in the example of FIG. 4), the plug 1 is introduced into said hole 4 such that the main body 2a and possibly at least part of the head 2b are arranged inside the hole 4. In addition, as a result of it having a diameter greater than the main body 2a and the hole 4 to be plugged, at least part of the head 2b is arranged outside said hole 4 such that it abuts with the wall itself which will be referred to hereinafter as the outer contact wall 4a. Since most holes have a first conical portion, the head 2b of the elastic element 2 according to any of the implementations hereof preferably includes a conical shape so that the plug 1 better adapts to or fits over both the hole 4 and the outer contact wall 4a.

Figure 4:
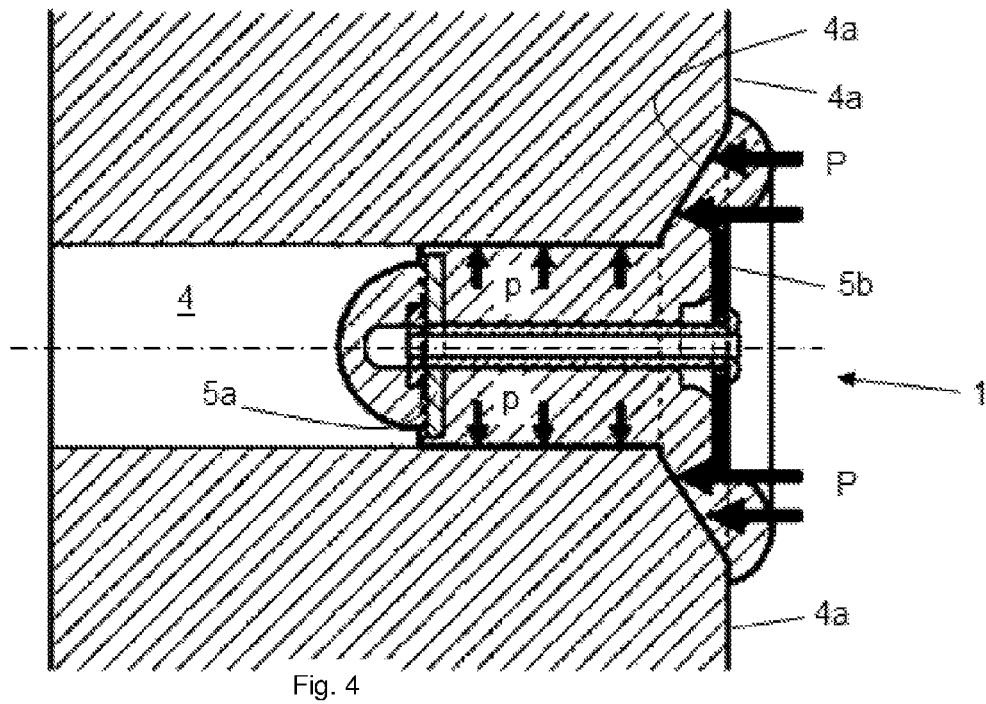
FIG. 4 shows the sealing plug of FIG. 1 inserted and in a deformed state into a hole in a wall where the protective tube has been removed.
Figure 5:
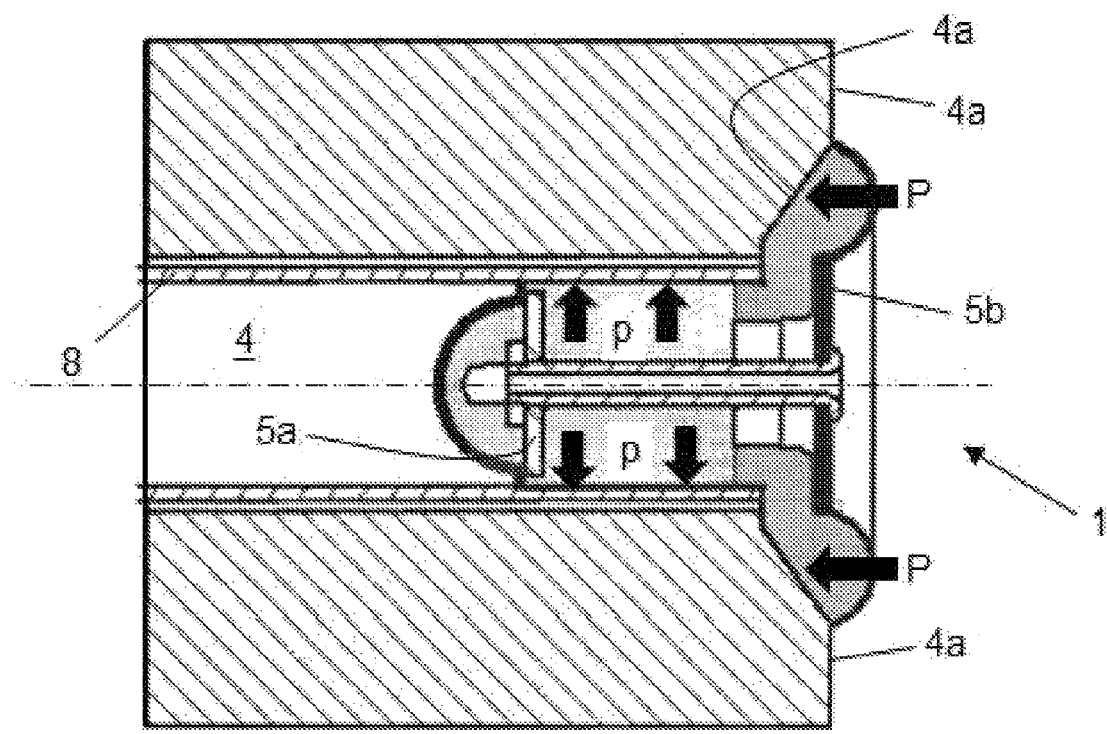
FIG. 5 shows the sealing plug of FIG. 1 inserted and in a deformed state into a hole in a wall where the protective tube has not been removed.

The plug 1 also may also include a rivet sleeve 9 as shown in the figs. When the stem 3 is pulled on by its free end 3a by a riveter or a similar tool, the head 3" of the stem 3 compresses and therefore deforms the rivet sleeve 9 exerting compression pressure on the first thrust washer 5a by the deformed rivet sleeve 9 (see FIGS. 4 and 5). The plug 1 is compressed between said first thrust washer 5a and the second thrust washer 5b.

Radial expansion of the plug 1 consequently occurs upon compressing the plug 1. Expansion continues until the stem 3 breaks at a notch, not shown in the drawings, disposed in the main rod 3' of the stem 3 and arranged close to the head 3". As a result of the radial expansion of the main body 2a, the latter one adapts to and fits with the inner face of the hole 4 while at the same time exerts radial closing pressure "p" on said inner face, internally plugging and sealing said hole 4. Likewise, the elastic body 2 also assures the sealing of the outer contact wall 4a of the hole 4 to be plugged because at least part of the head 2b changes its geometry to adapt to and to fit with the shape of the outer contact wall 4a, while at the same time exerts axial closing pressure "P" on said outer contact wall 4a of the hole 4 to be plugged, as shown in FIGS. 4 and 5, thus assuring good hermetic closure of the hole 4. The fact that the head 2b of the elastic body 2 has a compressive strength less than the main body 2a assures that the head 2b deforms and exerts said axial closing pressure "P" on the outer contact wall 4a before the stem 3 breaks, which is normally determined by the radial closing pressure "p".

The elastic body 2 of the plug 1 is kept deformed by the rivet sleeve 9, as shown in FIGS. 3A, 3B, 3C, 3D and 3E, which, as explained above, is also compressed when pulling on the stem 3 by the riveter or a similar tool, thus preventing the elastic body 2 from recovering its initial geometry.

Everything that has been described up until now is also applicable for the rest of the implementations that will be detailed throughout the description.

According to the first implementation of the sealing plug 1, the main body 2a and the head 2b form a single part. However, according to a second implementation both parts are independent from one another even though they are attached.

Figure 2B:
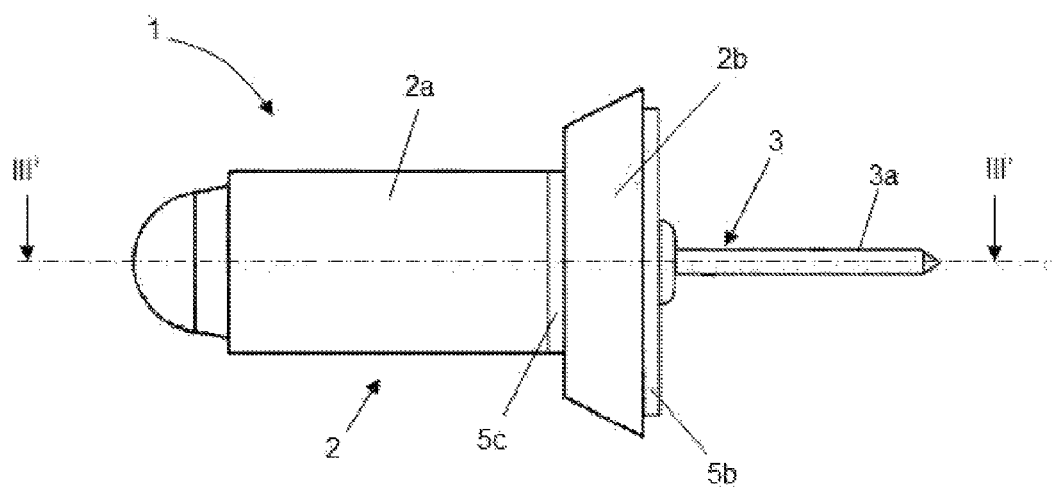
FIG. 2B shows a side view of a second implementation of a sealing plug according to the present subject matter.
Figure 3B:
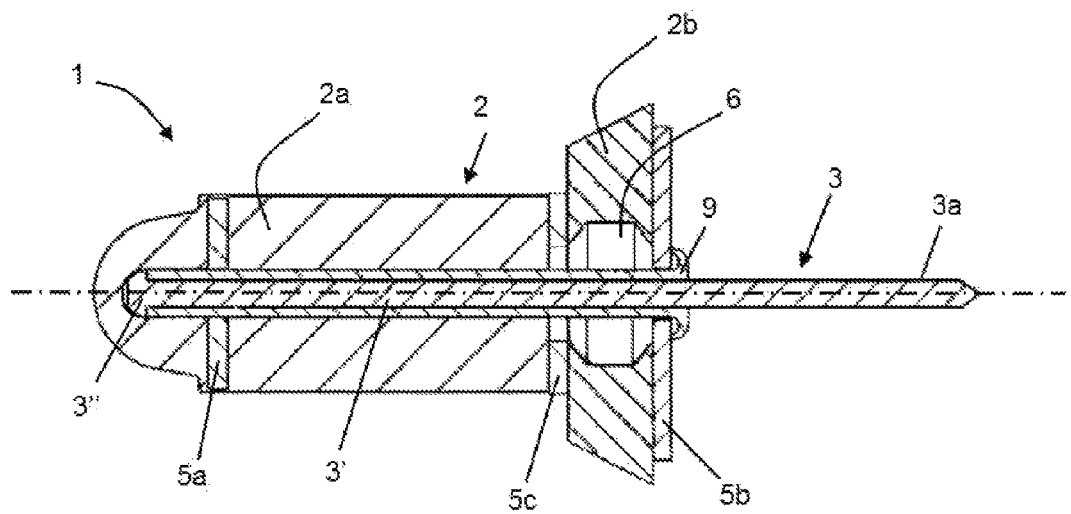
FIG. 3B is a cutaway view of the sealing plug of FIG. 2B.

The plug 1 according to this second implementation may include all the features of the plug of the first implementation and may further have an intermediate washer 5c arranged between the first thrust washer 5a and the second thrust washer 5b. As shown in FIGS. 2B and 3B, said intermediate washer 5c is preferably arranged between the main body 2a and the head 2b, such that the intermediate washer 5c is arranged joined to the main body 2a, being visible from the outside. Said intermediate washer 5c allows better control of the deformation of the head 2b caused by the expansion of the plug 1 towards the outer contact wall 4a, thus favoring sealing the outer wall of the hole 4 to be plugged.

Both in the first and in the second implementations hereof, for the head 2b to have less compressive strength, said head 2b can be of a material softer than the material of the main body 2a. Another way for the head 2b to have less compressive strength, considering that both the head 2b and the main body 2a may or may not be made of the same material, can be to remove material from the head 2b in order to weaken it. In this sense, as shown in the examples of FIGS. 3A, 3B, 3C and 3D, the head 2b may internally have a cavity 6. Said cavity 6 provides a gap in the head 2b after the stem 3 has been assembled in the plug 1 and before said head 2b has been deformed. To prevent complicating the manufacture of said head 2b, this cavity 6 could be an enlargement of the hole for the passage of the stem 3. On one hand, the cavity of the head 2b may prevent oversizing the main body 2a to obtain the desired compressive strength difference between the head 2b and the main body 2a. On the other hand, said cavity 6 may also favor the fluidity of the head 2b allowing the material to flow more readily and better adapt to the geometry of the outer contact wall 4a, exerting the necessary axial closing pressure "P" on said outer wall, contributing to an improved sealing of the hole 4 in this sense. The greater the deformation of the head 2b, the greater the portion of the outer contact wall 4a surrounding the hole 4 to be plugged would be covered by the plug 1, the sealing of the hole 4 may therefore be significantly improved.

In many applications, plugging the hole only in the inner portion may be insufficient since said hole can have irregularities, in concrete walls for example, that enable water or other liquids to leak in, even through the outer front contact wall. In this sense, use of a plug 1 according to any of the implementations hereof may be particularly advantageous for hermetically plugging and sealing holes in a concrete wall, particularly in a concrete wall of a water tank.

In many other applications in which a protective tube 8 is not removed from the concrete wall, the sealing of the inner diameter of said protective tube 8 may not prevent leaks between the outside of the protective tube 8 and the outer concrete wall. Therefore, with the sealing plug 1 according to any of the implementation hereof hermetic sealing both of the inside and of the outside of the protective tube 8 with respect to the concrete wall may be achieved, as shown in FIG. 5.

Figure 3C:
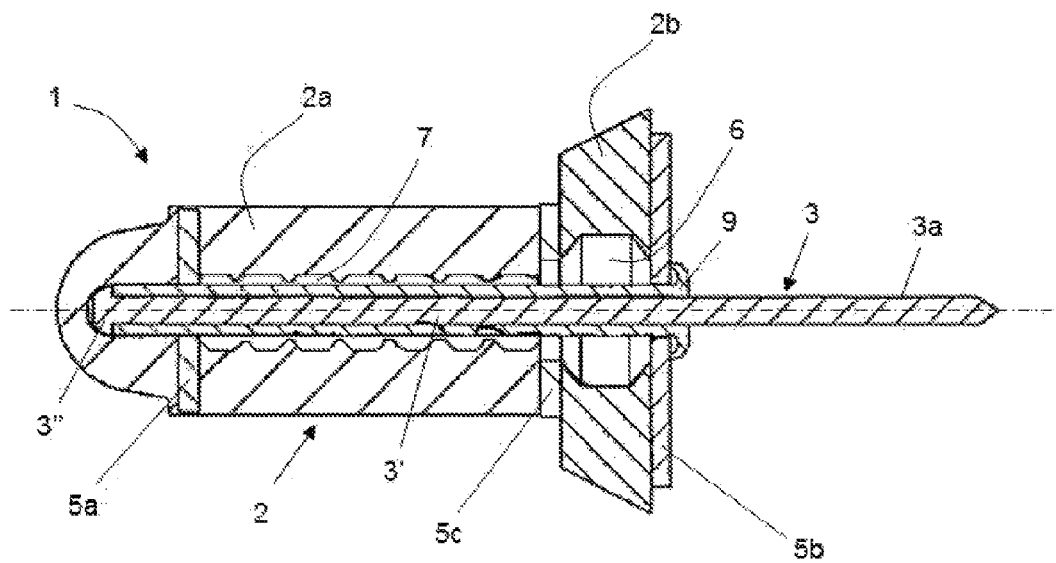
FIG. 3C is a cutaway view of a third implementation of a sealing plug according to the present subject matter.
Figure 3D:
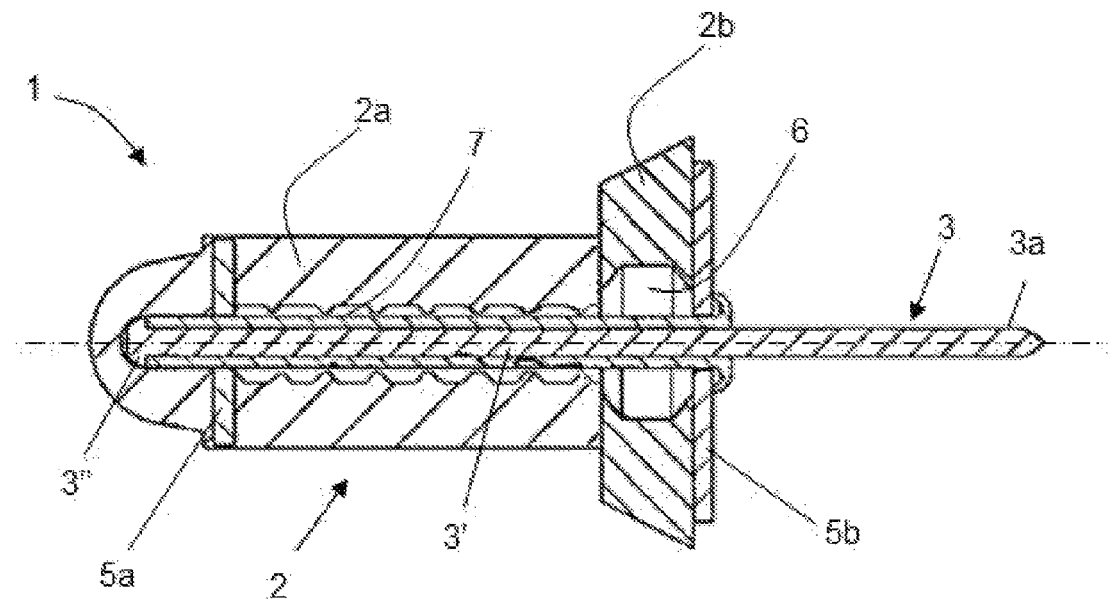
FIG. 3D is a cutaway view of FIG. 3C but without the intermediate washer.

The plug 1 according to a third implementation hereof may include all the features of the plug 1 of the first implementation. Optionally, it can also have the intermediate washer 5c described for the plug 1 of the second implementation. However, the main body 2a of the elastic body 2 of the plug 1 of this third implementation may also internally have a cavity 7 as shown in FIG. 3C. Said cavity 7 can provide a gap in the main body 2a after the stem 3 has been assembled in the plug 1 and before said body 2a has been deformed. This cavity 7 may thus allow for improving the fluidity of the body 2a during the deformation of the plug 1, allowing the material to flow more readily, being better adapted to the geometry of the hole 4.

Figure 3E:
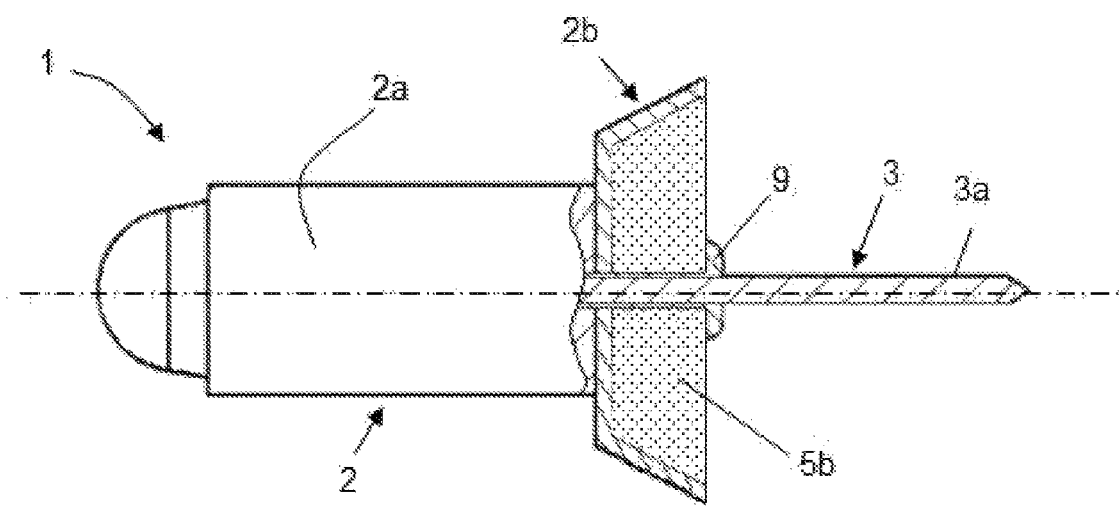
FIG. 3E shows a side view with a partial cutaway of another implementation of a sealing plug according to the present subject matter.

The plug 1 according to another implementation according to the present subject matter may include all the features of the plug 1 of the first implementation. Furthermore, the main body 2a and the head 2b can form a single part or be independent from one another, and the main body 2a can optionally have the cavity 7 described for the plug 1 of the second implementation, and the plug 1 can also include the intermediate washer 5c described for the plug 1 of the second implementation. However, in this implementation the head 2b may internally have a rigid body which can be made of metal, plastic or the like, as shown in FIG. 3E, and which performs the same function as the second thrust washer 5b, i.e., said rigid body allows the plug 1 to be compressed between the first thrust washer 5a and said rigid body when the stem 3 is pulled on by a riveter or a similar tool. As a result of said operation of pulling on the stem 3, the deformable portion of the head 2b can thus have a compressive strength less than that of the main body 2a while at the same time the head 2b may be reinforced by said rigid body which, as its own name indicates, gives "body" to the head 2b. The deformable portion of the head 2b surrounds the rigid body and when the stem 3 is pulled on, said deformable portion of the head 2b changes its geometry to adapt to the shape of the outer contact wall 4a of the hole 4 to be plugged, exerting axial closing pressure "P" on said outer wall.

The invention claimed is:

1. A sealing plug for closing a hole in a wall, the hole in the wall having an inner face, and the wall having an outer contact surface surrounding the hole in the wall; the sealing plug being of the type comprising:
    an elastic body and
    a stem coaxially assembled with one another, the stem having a free end emerging out of the elastic body;
    said elastic body comprising
        a main body which is configured for being expanded radially when pulling on the free end of the stem emerging out of the elastic body, thus exerting a radial closing pressure (p) on the inner face of the hole to be plugged, and
        a head attached to the main body, said head being configured for being compressed and for hermetic sealing and exerting an axial closing pressure (P) on the outer contact surface of the wall surrounding the hole to be plugged when pulling on the free end of the stem, the head comprising a compressive strength less than that of the main body such that at least part of said head changes its geometry to adapt to the shape of the outer contact surface of the wall surrounding the hole to be plugged,
    the sealing plug also comprising
        a first thrust washer arranged close to the opposite end of the area of attachment between said head and the main body and
        a second thrust washer arranged on the outer face of the head such that it enables the compression of the plug between said first and second thrust washers.

2. A sealing plug according to claim 1, wherein said first thrust washer is arranged inside the main body.

3. A sealing plug according to claim 1, comprising a rivet sleeve which is compressed against the first thrust washer and therefore deformed by a head of the stem when pulled on the free end of said stem emerging out of the elastic body.

4. A sealing plug according to claim 3, wherein the stem exerts compression pressure on the first thrust washer through the deformed rivet sleeve when pulling on the free end of said stem.

5. A sealing plug according to claim 1, comprising an intermediate washer arranged between the first thrust washer and the second thrust washer.

6. A sealing plug according to claim 5, wherein said intermediate washer is arranged between the main body and the head.

7. A sealing plug according to claim 1, wherein the main body and the head form a single part.

8. A sealing plug according to claim 1, wherein the main body and the head are two independent parts attached to one another.

9. A sealing plug according to claim 1, wherein the head internally comprises at least one cavity after the stem has been assembled in the plug and before said head has been deformed.

10. A sealing plug according to claim 1, wherein the head internally comprises a rigid body.

11. A sealing plug according to claim 1, wherein the main body internally comprises at least one cavity after the stem has been assembled in the plug and before said body has been deformed.

12. A sealing plug according to claim 1, wherein the head comprises a material softer than that of the main body.

13. A sealing plug according to claim 1, wherein the stem of the sealing plug is a rivet.

* * * * *